(12) United States Patent
Namba et al.

(10) Patent No.: US 8,865,368 B2
(45) Date of Patent: Oct. 21, 2014

(54) ELECTRODE MATERIAL, FUEL CELL INCLUDING THE SAME, AND METHOD OF MANUFACTURING THE SAME

(75) Inventors: Masaharu Namba, Nagoya (JP); Naomi Teratani, Nagoya (JP); Yoshihiko Yamamura, Nagoya (JP); Kazuyuki Matsuda, Kasugai (JP); Naomi Fukui, Seto (JP)

(73) Assignee: NGK Insulators, Ltd., Nagoya (JP)

( * ) Notice: Subject to any disclaimer, the term of this patent is extended or adjusted under 35 U.S.C. 154(b) by 534 days.

(21) Appl. No.: 13/070,698

(22) Filed: Mar. 24, 2011

(65) Prior Publication Data

US 2011/0236789 A1    Sep. 29, 2011

(30) Foreign Application Priority Data

Mar. 25, 2010 (JP) .................. 2010-70793
Jan. 25, 2011 (JP) .................. 2011-12852
Mar. 8, 2011 (JP) .................. 2011-50537
Mar. 8, 2011 (JP) .................. 2011-50538

(51) Int. Cl.
| | | |
|---|---|---|
| H01M 8/10 | (2006.01) | |
| H01M 4/90 | (2006.01) | |
| C01G 53/00 | (2006.01) | |
| C04B 35/01 | (2006.01) | |
| C04B 35/626 | (2006.01) | |
| H01B 1/08 | (2006.01) | |
| H01M 8/12 | (2006.01) | |

(52) U.S. Cl.
CPC ........... *H01M 4/9016* (2013.01); *C01G 53/006* (2013.01); *C04B 35/01* (2013.01); *C04B 35/62675* (2013.01); *H01B 1/08* (2013.01); *H01M 4/9033* (2013.01); *C01G 53/70* (2013.01); *C01P 2002/52* (2013.01); *C01P 2002/72* (2013.01); *C01P 2006/10* (2013.01); *C01P 2006/32* (2013.01); *C01P 2006/40* (2013.01); *C04B 2235/3205* (2013.01); *C04B 2235/3208* (2013.01); *C04B 2235/3213* (2013.01); *C04B 2235/3224* (2013.01); *C04B 2235/3227* (2013.01); *C04B 2235/3244* (2013.01); *C04B 2235/3262* (2013.01); *C04B 2235/3272* (2013.01); *C04B 2235/3277* (2013.01); *C04B 2235/3279* (2013.01); *C04B 2235/3281* (2013.01); *C04B 2235/44* (2013.01); *C04B 2235/656* (2013.01); *C04B 2235/6567* (2013.01); *C04B 2235/6585* (2013.01); *C04B 2235/764* (2013.01); *C04B 2235/77* (2013.01); *C04B 2235/79* (2013.01); *C04B 2235/9607* (2013.01); *H01M 2008/1293* (2013.01); *Y02E 60/525* (2013.01); *Y02E 60/50* (2013.01); *C01P 2002/34* (2013.01); *C01P 2004/80* (2013.01)
USPC ...................... 429/489; 429/519.15

(58) Field of Classification Search
CPC ........... H01M 2/00; H01M 4/02; H01M 4/06; H01M 4/14
USPC .............................. 429/517–522, 489, 519.15
See application file for complete search history.

(56) References Cited

U.S. PATENT DOCUMENTS

| | | | |
|---|---|---|---|
| 2009/0029199 A1 | 1/2009 | Tao | |
| 2010/0092809 A1* | 4/2010 | Drzal et al. | ................ 429/12 |
| 2010/0098999 A1* | 4/2010 | Niimi et al. | ................ 429/33 |
| 2010/0190090 A1* | 7/2010 | Kuno et al. | ................ 429/495 |

FOREIGN PATENT DOCUMENTS

| | | |
|---|---|---|
| CN | 1560951 A | 1/2005 |
| JP | 3414657 | 4/2003 |
| JP | 3617814 B2 | 2/2005 |
| JP | 2009-277411 | 11/2009 |
| WO | 2004/013882 A2 | 2/2004 |

OTHER PUBLICATIONS

Juncai Sun, et al., "Cathode materials $LaNi_{1-x},Cu_x,O_3$ for Low Temperature Solid Oxide Fuel Cells," Journal of the Korean Ceramic Society, vol. 45, No. 12, 2008, pp. 755-759.

Yasuo Takeda, et al., "Preparation and Characterization of $LaCu_{1-x}M_mO_3$ ($M=Fe, Ni$)," (with English Translation), Powder and Powder Metallurgy, vol. 41, No. 12 (1994), pp. 1475-1480.

Hiroaki Taguchi et al., "Characterization of $LaNi_xCo_yFe_{1-x-y}O_3$ as a Cathode Material for Solid Oxide," Solid State Ionics, vol. 182, Dec. 28, 2001, pp. 127-132.

V.V. Kharton. et al, "Surface-Limited Oxygen Transport and Electrode Properties of $La_2Ni_{0.8}Cu_{0.2}O_{-1+\delta}$" Solid State Ionics, vol. 166, 2004, pp. 327-337.

Rajendra N. Basu, et al., "Microstructure and Electrical Conductivity of $LaNi_{0.6}Fe_{0.4}O_3$ Prepared by Combustion Synthesis Routes," Materials Research Bulletin, vol. 29, 2004, pp. 1335-1345.

Chinese Office Action (Application No. 201110084778.1) dated Feb. 7, 2014.

\* cited by examiner

*Primary Examiner* — Mark F Huff
*Assistant Examiner* — Rashid Alam
(74) *Attorney, Agent, or Firm* — Burr & Brown, PLLC (57) ABSTRACT

A novel electrode that can be used at high temperature in air, a fuel cell using the material, and a method of manufacture of the same are provided. The electrode material containing a component expressed by $La_{1-s}A_sNi_{1-x-y-z}Cu_xFe_yB_zO_{3-\delta}$ (wherein, A and B are at least one element independently selected from the group consisting of alkaline earth metals, transition metals excluding Fe, Ni and Cu, and rare earths excluding La, and x>0, y>0, x+y+z<1, 0≤s≤0.05, and 0≤z≤0.05) exhibits relatively high conductivity at high temperature, and has the advantage of combination with other materials in relation to coefficient of thermal expansion.

15 Claims, 4 Drawing Sheets

ELECTRODE MATERIAL, FUEL CELL INCLUDING THE SAME, AND METHOD OF MANUFACTURING THE SAME

CROSS-REFERENCE TO RELATED APPLICATIONS

This application claims priority under 35 U.S.C. §119 to Japanese Patent Applications No. 2010-70793 filed on Mar. 25, 2010, No. 2011-12852 filed on Jan. 25, 2011, No. 2011-50537 Mar. 8, 2011, and No. 2011-50538 Mar. 8, 2011. The entire disclosure of Japanese Patent Applications No. 2010-70793 filed on Mar. 25, 2010, No. 2011-12852 filed on Jan. 25, 2011, No. 2011-50537 Mar. 8, 2011, and No. 2011-50538 Mar. 8, 2011 are hereby incorporated herein by reference.

BACKGROUND OF THE INVENTION

1. Field of the Invention

The technical field relates to an electrode material, a fuel cell including the same, and a method of manufacturing the same.

2. Description of the Related Art

A solid oxide fuel cell (SOFC) includes a plurality of cells having an anode, an electrolyte layer, a cathode, and a current collecting layer. In an SOFC, the cell is laminated through a separator and an interconnector. The current collecting layer is provided to reduce electrical resistance at a connection between the cathode and the separator, or with the interconnector.

An SOFC as described in Japanese Patent Application Laid-Open No. 2009-277411 includes a connecting layer arranged between the cathode and the separator. In Japanese Patent Application Laid-Open No. 2009-277411, the material used in the connecting layer includes a Pt paste or a conductive metal oxide powder. In Japanese Patent Application Laid-Open No. 2009-277411, the conductive metal oxide powder includes $LaNi_{1-x}Fe_xO_3$, $La_{1-x}Sr_xCoO_3$, and the like.

In Japanese Patent No. 3414657, the cathode material includes $LaNi_{1-x}Fe_xO_3$.

SUMMARY OF THE INVENTION

Pt has a high cost, and is unsuitable as a material for general purpose articles.

When $La_{1-x}Sr_xCoO_3$ is used as the material for the current collecting layer, the coefficient of thermal expansion (heat expansion ratio) of the current collecting layer material is 18-20 ppm/K, and is extremely large in comparison to the coefficient of thermal expansion of the cathode of 12.5 ppm/K when for example $La_{1-y}Sr_yCo_{1-z}Fe_zO_3$ is the material used in the cathode. A large mismatch of coefficient of thermal expansion between the cathode material and the current collecting layer material causes cracking in the current collecting layer or delamination between the cathode and the current collecting layer.

Although the coefficient of thermal expansion of $LaNi_{1-x}Fe_xO_3$ is of the order of 13.4-9.8 ppm/K, the conductivity in air at 600-1000° C. has a low value of not more than 700 S/cm. Consequently, there is a need for a new electrode material that can be used at high temperature in air.

Therefore, the object of the present invention is to provide a material or the like that exhibits improvement both in respect of coefficient of thermal expansion and conductivity for use as a material in an electrode of a fuel cell, or the like.

An electrode material according to a first aspect of the present invention has a composition expressed as $La_{1-s}A_s Ni_{1-x-y-z}Cu_xFe_yB_zO_{3-\delta}$. Wherein, A and B are at least one element independently selected from the group consisting of alkaline earth metals, transition metals excluding Fe, Ni and Cu, and rare earths excluding La. x, y, z and s meet x>0, y>0, x+y+z<1, 0≤s≤0.05, and 0≤z≤0.05.

This electrode material may be manufactured by a method including the step of firing a material that includes La, Ni, Cu and Fe and that has a molar ratio of La, Ni, Cu and Fe of La:Ni:Cu:Fe=1:(1−x−y):x:y (wherein 0<x, 0<y, x+y<1) at not more than 1200° C., and preferably at not more than 1200° C. in $O_2$.

BRIEF DESCRIPTION OF DRAWINGS

Referring now to the attached drawings, which form a part of this original disclosure.

DETAILED DESCRIPTION OF THE INVENTION

1. Electrode Material

An electrode material according to the present invention has a composition expressed as $La_{1-s}A_s Ni_{1-x-y-z}Cu_xFe_yB_zO_{3-\delta}$. Wherein, A and B are at least one element independently selected from the group consisting of alkaline earth metals, transition metals excluding Fe, Ni and Cu, and rare earths excluding La. x, y, z and s meet x>0, y>0, x+y+z<1, 0≤s≤0.05, and 0≤z≤0.05.

An example of an alkaline earth metal is Ca and Sr, or the like. An example of a transition metal is Sc, Ti, Cr, Mn, Co, Y, Zr, or the like. An example of a rare earth is Ce, Pr, Gd, or the like.

Element A may be at least one element selected from the group consisting of alkaline earth metals and rare earths excluding La. Element B may be at least one element selected from transition metals excluding Fe, Ni and Cu.

This material realizes both high conductivity and low coefficient of thermal expansion. More specifically, when fired in $O_2$, the conductivity of the material at 750° C. may, be 800 S/cm or more, 850 S/cm or more, or 880 S/cm or more. Furthermore, the coefficient of thermal expansion of the material fired in $O_2$ may be not more than 14.0 ppm/K, or not more than 13.5 ppm/K. Furthermore, when fired in air, the conductivity of the material may be at least 800 S/cm at 750° C., at least 850 S/cm, or may be at least 880 S/cm.

Furthermore, the coefficient of thermal expansion of the material when fired in air is preferably not more than 14.5 ppm/K.

In order to realize these conductivity and coefficient of thermal expansion values, a range for the value of x may be x≥0.05, or x≤0.5, or 0.05≤x≤0.5, or 0.1≤x≤0.5. In addition, a range for the value of y may be y≥0.03, or y≤0.3, or 0.03≤y≤0.3, or 0.03≤y≤0.2. A range of δ≤0.4 is preferred, a range of δ≥0.0 is more preferred, and 0.0≤δ≤0.4 still more preferred.

Higher conductivity is obtained when $x \geq 0.05$, and a still higher conductivity is obtained when $x \leq 0.5$.

The coefficient of thermal expansion is suppressed to a low value when $y \geq 0.03$. High conductivity is obtained when $y \leq 0.3$.

Still higher conductivity is obtained when $\delta \leq 0.4$. Although a superior result is obtained even when $\delta < 0.0$, since costs are incurred due to the requirement to increase the partial pressure of oxygen during preparation, the range $\delta \geq 0.0$ is further preferred.

At least one of $s>0$ or $z>0$ may be satisfied, or at least one of $s \geq 0.005$ and $z \geq 0.005$ may be satisfied, or at least one of $s \geq 0.01$ and $z \geq 0.01$ may be satisfied.

When $s=0$, and $z=0$, $La_{1-s}A_sNi_{1-x-y-z}Cu_xFe_yB_zO_{3-\delta}$ in the above formula becomes $LaNi_{1-x-y}Cu_xFe_yO_{3-\delta}$.

Since both high conductivity and low coefficient of thermal expansion are obtained, this material is suitably used as a material in a fuel cell, and in particular, is suitable for use as an electrode material of a fuel cell. As used herein, an "electrode" includes not only a cathode or an anode, but is a concept that also includes a current collecting layer.

The electrode material does not include a high-cost material such as Pt or the like as a required component, and therefore can be used as a low-cost electrode material.

The crystal phase of this material preferably contains a perovskite phase, and more preferably a perovskite single phase. In this manner, higher conductivity is realized.

Normally, all Ni in $LaNiO_3$ are trivalent. However, a portion of the Ni may be bivalent. The heterogeneous phase that originates from the bivalent Ni is expressed as general formula $La_{n+1}Ni_nO_{3n+1}$ (wherein, n is 1, 2, or 3). For example when n=3, the heterogeneous phase is expressed as $La_4Ni_3O_{10}$, and includes four $La^{3+}$, two $Ni^{3+}$ and one $Ni^{2+}$. High conductivity is obtained when a heterogeneous phase is not present in the electrode material or when the corresponding abundance ratio of heterogeneous phase in the electrode material is low. XRD (X-ray diffraction) pattern of the heterogeneous phase exhibits a peak at 31.2°-32.3°. Therefore, no peak at this position, or a small peak is preferred in order to express high conductivity.

Since $x>0$ and $y>0$, $LaNiO_3$ in the electrode material is simultaneously substituted with Cu and Fe. Since this simultaneous substitution achieves both high conductivity and low coefficient of thermal expansion, the addition of elements such as the elements A or B, or the like is allowed. Furthermore, additional control of the conductivity and the coefficient of thermal expansion is enabled by the added amount of the elements. When this electrode material is applied to the electrode of a fuel cell, the bonding properties of the electrode material/fuel cell material interface are improved by a configuration in which the elements contained in the layer that make contact with a layer of the electrode material are contained in the layer of the electrode material.

The electrode material may include element A and/or B as a compound other than $La_{1-s}A_sNi_{1-x-y-z}Cu_xFe_yB_zO_{3-\delta}$. The proportion of A, B, La, Ni, Cu and Fe in the electrode material may be La: A:Ni:Cu:Fe:B=1-s:s:1-x-y-z:x:y:z. Furthermore, at least one of $s \geq 0.005$ and $z \geq 0.005$ may be satisfied, or at least one of $s \geq 0.01$ and $z \geq 0.01$ may be satisfied.

The electrode material containing $La_{1-s}A_sNi_{1-x-y-z}Cu_xFe_yB_zO_{3-\delta}$ is suitably configured as an electrode material for a fuel cell, and in particular is suitable as a material for a current collecting layer. Since this electrode material has high conductivity, when applied in a current collecting layer, electrical resistance can be reduced in the connection between a cathode and a separator or an interconnector. Furthermore since the mismatch of the coefficient of thermal expansion between the cathode and the current collecting layer is suppressed to a small value, cracking or delamination is suppressed between the cathode and the current collecting layer.

When applied to a cathode, $La_{1-s}A_sNi_{1-x-y-z}Cu_xFe_yB_zO_{3-\delta}$ may be used as a single material, or a composite material with a rare-earth doped ceria such as $Ce_{0.9}Gd_{0.1}O_2$ (GDC) may be used. A rare-earth doped ceria is a solid electrolyte material, is known to exhibit low reactivity with perovskite oxides, and does not form a high-resistance compound even when subjected to high temperature such as during firing. When $LaNi_{1-x-y}Cu_xFe_yO_{3-\delta}$ is mixed with a rare-earth doped ceria that does not have very high coefficient of thermal expansion such as 12 ppm/K, further reduction of the coefficient of thermal expansion of the mixture layer is enabled depending on the mixing ratio. Since a rare-earth doped ceria and a solid electrolyte exhibit superior interfacial adhesion, adhesion with a solid electrolyte can also be improved by forming a mixture layer, and thereby an improvement can be expected in the effect of preventing delamination resulting from a heat cycle.

2. Fuel Cell

The material in section [1.] above is used as an electrode material. A fuel cell will be described below that uses this material as a current collecting layer.

Figure 1:
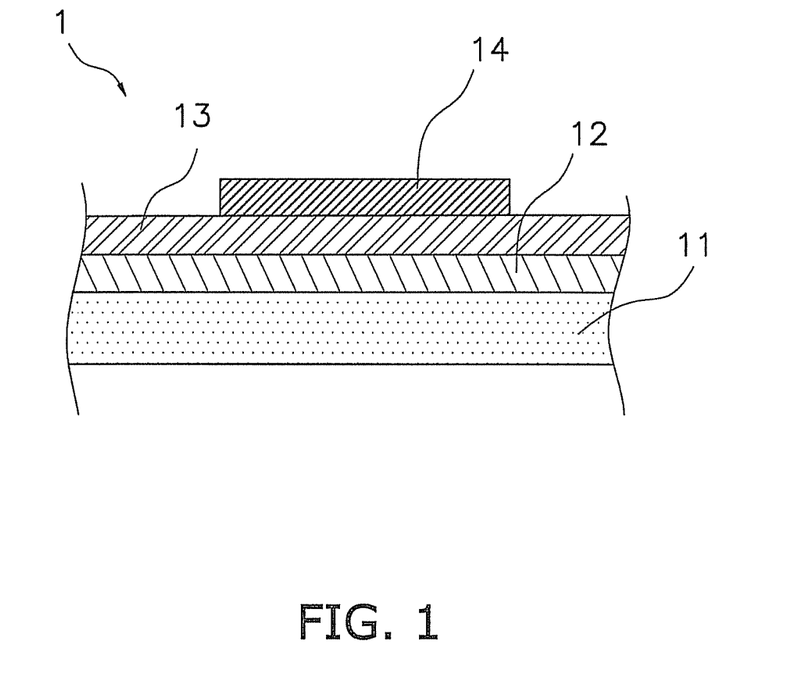
FIG. 1 is a cross sectional view of an example of a fuel cell.

The fuel cell according to the present embodiment is includes a fuel cell 1 as shown in FIG. 1 (hereinafter simply referred to as "cell"), and an interconnector (not shown). A plurality of cells 1 are stacked, and the interconnectors are arranged between the cells 1. The cells 1 are electrically connected by the interconnector.

The cells 1 are ceramic thin plates having a thickness of a level of 0.5-5 mm. As illustrated in FIG. 1, the fuel cell 1 according to the present embodiment includes an anode 11, an electrolyte layer (solid electrolyte layer) 12, a cathode 13, and a current collecting layer 14.

The material of the anode 11 includes, for example, NiO—YSZ. More specifically, the thickness of the anode 11 is substantially 0.5-5 mm. The anode 11 contains NiO and is imparted with conductivity by a reduction treatment.

The electrolyte layer 12 is provided between the cathode 13 and the anode 11. A ceria-based material which consists of ceria and a rare-earth may be used as the material for the electrolyte layer 12. The ceria-based material includes for example GDC (gadolinium doped ceria), SDC (samarium doped ceria), and the like. The concentration of the rare earth in the ceria-based material is preferably 5-20 mol %. Rare earth stabilized zirconium may also be used.

The thickness of the current collecting layer 12 is for example 20 μm or less.

The material used as the cathode for example includes LSCF (lanthanum strontium cobalt ferrite). The thickness of the cathode 13 is approximately 5-50 μm.

The current collecting layer 14 includes the electrode material as described above. The thickness of the current collecting layer 14 is approximately 5-200 μm. The current collecting layer 14 for example is prepared by firing a green body which consists of the cathode 13 and the green tape of the electrode material attached to the cathode 13.

The cell 1 may include a component such as another layer, and may vary features such as the shape, material or dimension of various components.

3. Method of Manufacturing Electrode Material (1) First Manufacturing Method

The method of manufacture for an electrode material in [1.] above may include the step of firing a material that includes La, Ni, Cu and Fe, and has a molar ratio of La, Ni, Cu and Fe of La:Ni:Cu:Fe=1:(1−x−y):x:y at not more than 1200° C. (firing step). The manufacturing method includes preparation of a starting material that includes La, Ni, Cu, and Fe in these proportions.

The starting materials used in the firing step may be obtained by mixing a metal oxide powder and/or a hydroxide powder as described above, or may be obtained by a liquid phase synthesis method or a co-precipitation method in which the starting material is a metal alkoxide or a metal nitrate.

The preferred range for x, y, and δ has been described above. In other words, the starting material preferably is prepared so that the molar ratio of La, Ni, Cu and Fe is La:Ni:Cu:Fe=1:0.2-0.92:0.05-0.5:0.03-0.03. Reduction of Ni and Cu tends to occur under high temperature in air. As a result, the firing step in the manufacturing of this material is preferably conducted at not more than 1200° C. to prepare δ in a suitable range. The firing step is preferably performed at not more than 1200° C. in $O_2$.

The firing step may be considered as a single step, or may include two or more thermal treatments having different temperature conditions. At least one treatment of these treatments may execute thermal treatment of the starting material above to a temperature of at least 1100° C. The firing step may include a thermal treatment set to having a temperature condition set to less than 1100° C. The temperature condition in any of the thermal treatments may be set to a temperature condition of not more than 1200° C. Although Fe has relatively low reactivity, production of single-phase perovskite structures is facilitated by thermal treatment of the starting materials to at least 1100° C.

Before the firing step, a calcination process may be executed to calcine the starting material at a temperature of at least 1100° C. When executing the calcination process, the temperature during the firing step may be less than 1100° C. Furthermore, the calcination process may be performed at not more than 1200° C.

However, the firing temperature conditions, and the time and the like required for firing may be varied in response to the starting material particle diameter and other conditions.

(2) Second Manufacturing Method

The firing step of a method of manufacturing the electrode material including the element A and/or the element B may include a step of placing a green body being a mixture containing La, Ni, Cu and Fe in the above proportions adjacent to a layer containing the element A and/or the element B, and firing. In this manner, the element A and/or the element B diffuse in the fired body, and thereby obtains $La_{1-s}A_sNi_{1-x-y-z}Cu_xFe_yB_zO_{3-\delta}$.

The layer that contains the element A and/or the element B includes a SOFC solid electrolyte, a cathode, or an interconnector, or the like. In particular, the alkaline earth metal may be contained in a cathode material such as $La_{1-x}Sr_xCoO_3$ or $La_{1-x}Sr_xCo_{1-y}Fe_yO_3$, or the like, or an interconnector material such as $La_{1-x}Ca_xCrO$, or the like. A rare earth may be contained in the electrolyte material such as GDC (gadolinium doped ceria), a cathode material, an interconnector material, or the like. The transition metal element may be contained in the electrolyte material such as YSZ (yttria stabilized zirconia), a cathode material, an interconnector material, or the like.

Other conditions may include applying the same conditions as the first manufacturing method in (1) above.

(3) Third Manufacturing Method

The firing step in a method of manufacture for an electrode material containing the element A and/or the element B may include the step of firing a starting material that includes La, Ni, Cu, Fe, the element A and the element B at a molar ratio of La:Ni:Cu:Fe:A:B=(1−s):(1−x−y−s):x:y:s:z at not more than 1200° C.

The starting material may be prepared so that the molar ratio of La, Ni, Cu and Fe is La:Ni:Cu:Fe=(0.95-1):(0.15-0.92):(0.05-0.5):(0.03-0.3). Furthermore, the range for s and z may be as described above.

Other conditions may include applying the same conditions as the first manufacturing method in (1) above or the second manufacturing method in (2) above.

EXAMPLES

Preparation of Test Sample and Measurement of Characteristics i. Working Examples E1-E23

Firing in $O_2$

Simultaneous substitution using Fe and Cu was executed in $LaNiO_{3-\delta}$. The characteristics of the resulting test sample were examined by changing the proportions of the Cu element and the Fe element.

(i-1) Preparation of Test Sample

After drying powders of lanthanum hydroxide, nickel oxide, copper oxide, and iron oxide for 12 hours at 110° C., weighing is performed at the predetermined molar ratios shown in Table 1.

These weighed powders are mixed with water, and then dried. Thereafter, a mixed powder is prepared by passing through a sieve.

Figure 2:
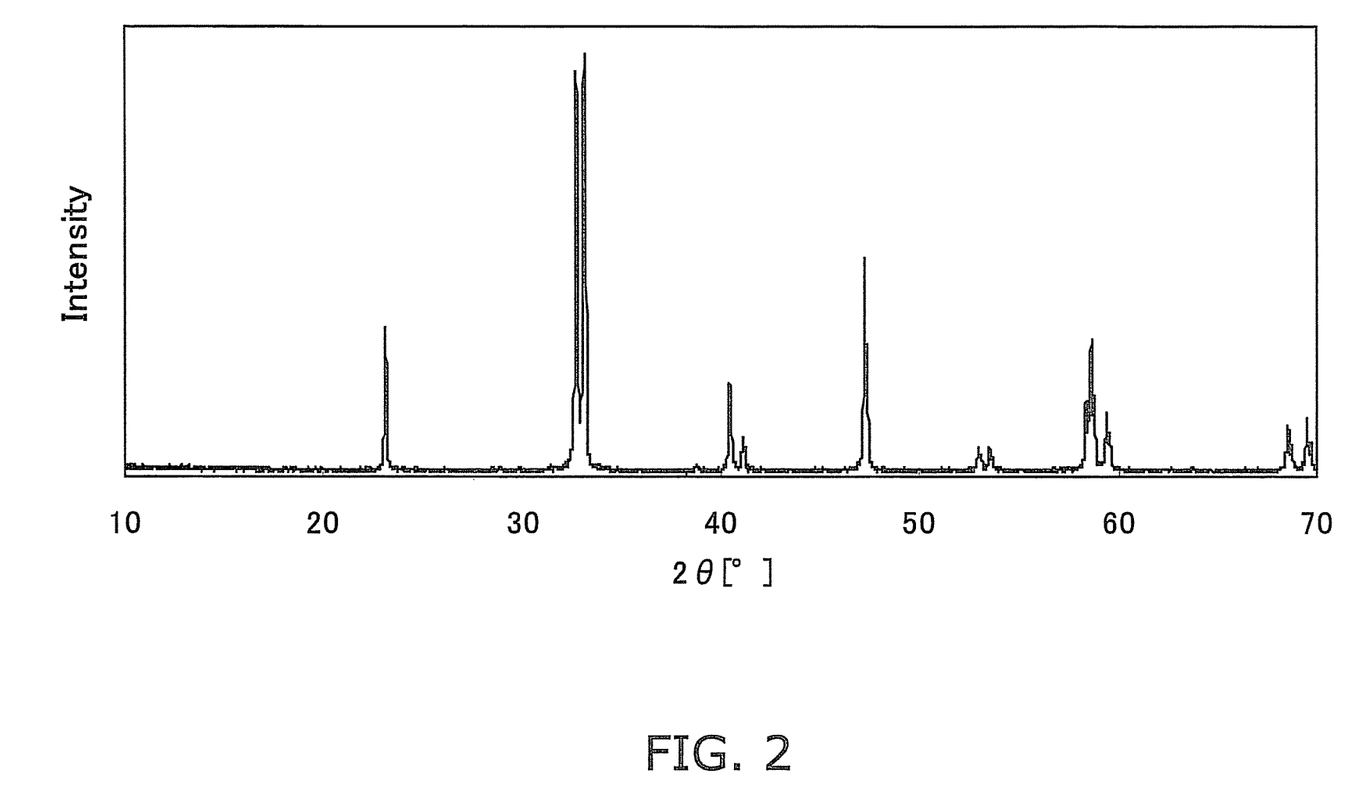
FIG. 2 is an XRD pattern of a test obtained in Working Example E1.

Then, placing the mixed powder in an aluminum crucible provided with a lid, a solid state reaction is performed by thermal treatment for 12 hours at a predetermined calcination temperature shown in the Table 1 in $O_2$ to thereby obtain respective perovskite phase calcined powders. FIG. 2 illustrates XRD pattern of the calcined powder in Working Example 1.

The calcined powder is pulverized, and pressed uniaxially to thereby obtain a green body using a cold isostatic press (CIP).

After placing the green body in an aluminum crucible with a lid, a fired body is obtained by a thermal treatment at a predetermined firing temperature for 12 hours as shown in Table 1 in $O_2$ (Working Example E1-E23).

(i-2) Measurement of Characteristics (Density)

The density of the fired body is calculated from the dimensions and the weight, and the results are shown in Table 1.

(Conductivity)

A test piece of 3×4×40 mm is cut from the fired body, and the conductivity of the fired body is measured at 600° C.-900° C. in air using a DC four-terminal method. Since the conductivity is also dependent on the density in addition to the composition ratio of the sintered body, the portion depending on the density of the measurement value is corrected using Equation (1) below derived with reference to Etsuro YAMADA (author) *"Shigen to Sozai"* vol. 119, No. 1, pages 1-8 published in 2003 based on the equation of Meredith et al.

$$\lambda e = \{(2+0.5\phi v) \times (2-0.54\phi v)\}/\{(2-\phi v) \times (2-2\phi v)\} \times \lambda c \quad (1)$$

Wherein:
measurement value=$\lambda c$,
conductivity after correction=$\lambda e$
(1−density)=$\phi v$
The conductivity after correction is shown in Table 1.

(Coefficient of Thermal Expansion)

A test piece of 3×4×20 mm was cut from the sintered body, and the coefficient of thermal expansion of the fired body was measured at 40-1000° C. in air using a dilatometer. The results are shown in Table 1.

(Oxygen Nonstoichiometry)

In some of the Working Examples, chemical analysis was performed by pulverizing a portion of the sintered body in a mortar. The molar ratio and the oxygen nonstoichiometry δ of the element is calculated from the resulting weight ratio of the elements. The results are shown in Table 7.

ii. Comparative Examples A1-A6

Substitution using Fe and Cu was executed with respect to $LaNiO_{3-\delta}$, and firing was performed in $O_2$. In other words, the ratio of the Cu element and the Fe element is different from the Working Examples, and the setting is adapted so that x or y takes a value of 0 (zero).

More specifically, in addition to the starting material ratio and other conditions as shown in Table 2, a test sample was prepared using the same operation as section i. above (firing in $O_2$), and the characteristics are measured. The results are shown in Table 2.

iii. Comparative Examples B1-B3

In the following comparative examples, simultaneous substitution was executed using Co (cobalt) and Fe to obtain a sintered body. In the comparative examples, the composition of the test sample is expressed as $LaNi_{1-a-b}Fe_aCo_bO_{3-\delta}$.

More specifically, in addition to the starting material ratio and other conditions as shown in Table 3, a test sample was prepared using the same operation as section i. above (firing in $O_2$) using starting materials including powders of lanthanum hydroxide, nickel oxide, cobalt oxide, and iron oxide, and the characteristics are measured. The results are shown in Table 3.

iv. Comparative Examples C1-C4

In the following comparative examples, a sintered body was formed in simultaneous substitution using Fe and Sr (strontium) that is an alkaline earth metal. The composition of the test sample is expressed as $La_{1-c}Sr_cNi_{1-a-b}Fe_aCo_bO_{3-\delta}$.

More specifically, in addition to the starting material ratio and other conditions as shown in Table 4, a test sample was prepared using the same operation as section i. above (firing in $O_2$) using starting materials including powders of lanthanum hydroxide, strontium carbonate, nickel oxide, cobalt oxide, and iron oxide, and the characteristics are measured. The results are shown in Table 4.

v. Working Examples F1-F23

Firing in Air

A test sample was prepared with reference to the starting material ratio and other conditions as shown in Table 5 using lanthanum hydroxide, nickel oxide, copper oxide and iron oxide, and the characteristics are measured. In particular, in the Working Examples, firing is executed by thermal treatment for one hour at a predetermined firing temperature shown in Table 5 in air. In addition to the conditions shown in Table 5, the same treatment as section i. above (firing in $O_2$) was executed. The results are shown in Table 5.

vi. Comparative Examples D1-D7

In the same manner as Working Examples F1-F23, simultaneous substitution using Fe and Cu was performed with respect to $LaNiO_{3-\delta}$, and then firing is executed in air. The ratio of the Cu element and the Fe element is different from the Working Examples, and a setting is adapted so that x or y takes a value of 0 (zero). More specifically, apart from the starting material ratio and other conditions as shown in Table 6, the same treatment as section i. above (firing in $O_2$) was executed to thereby obtain a test sample, and the characteristics thereof are measured. The results are shown in Table 6.

vii. Working Examples G1-G3

Working Example G1

Calcined powder is obtained by the operation of Working Example E1. After pulverizing the calcined powder, a green body was obtained by uniaxial pressing at 200 kgf/cm². A fired body is obtained by placing the green body in an aluminum crucible with a lid and thermal treatment for 12 hours at 1000° C. in air.

Working Examples G2 and G3

Starting materials include powders of lanthanum hydroxide, nickel oxide, copper oxide, iron oxide, and cobalt oxide that are used in the ratios as illustrated in Table 8, in conjunction with operations that are the same as those described in Working Example G1 to thereby obtain a fired body. The characteristics of the resulting fired body are measured by the same operations as those described in i. above. The results are shown in Table 8.

viii. Working Examples H1-H5

Working Example H1

Starting materials include powders of lanthanum hydroxide, nickel oxide, copper oxide, iron oxide, and zirconium oxide are used in the ratios as illustrated in Table 9 in conjunction with operations that are the same as those described in Working Example G1 to thereby obtain a calcined powder. After the calcined powder is pulverized, mixing is performed by addition of a solvent such as terpineol, and a binder such as ethylcellulose to obtain a paste. This paste is used to form a layer by screen-printing onto a YSZ fired body that is one type of SOFC electrolyte material. The resulting laminated body is dried, and a laminated fired body is obtained by thermal treatment at 1000° C. in air for one hour.

The characteristics of the resulting laminated fired body are measured using the same operations as those described in i. above, and the results are shown in Table 9.

Working Example H2

Starting materials include powders of lanthanum hydroxide, nickel oxide, copper oxide, iron oxide, and manganese oxide are used in the ratios as illustrated in Table 9 in conjunction with operations that are the same as those described in Working Example G1 to thereby obtain a calcined powder. A paste was obtained from the calcined powder by the same manner as Working Example H1. This paste is used to form a layer by screen-printing onto a $LaSrMnO_3$ fired body that is one type of SOFC cathode material. The resulting laminated body is dried and thermally treated in the same manner as Working Example H1 to obtain a laminated fired body.

The characteristics of the resulting laminated fired body are measured using the same operations as those described in i. above, and the results are shown in Table 9.

However, conductivity is configured as follows. The LaSrMnO$_3$ fired body acting as a substrate and the layer formed by screen-printing (hereinafter termed the "LaNiCuFeO$_3$ layer") both exhibit conductivity. Therefore, firstly the conductivity of the whole laminated fired body is obtained in the same manner as i. above. When the conductivity is assumed to be conductivity resulting from the parallel resistance of LaSrMnO$_3$ substrate with the LaNiCuFeO$_3$ layer formed by screen-printing, the conductivity of the LaNiCuFeO$_3$ layer may be calculated from the conductivity of the overall laminated fired body and the conductivity of LaSrMnO$_3$ substrate that is separately measured.

Working Example H3

Starting materials include powders of lanthanum hydroxide, nickel oxide, copper oxide, iron oxide, and gadolinium oxide are used in the ratios as illustrated in Table 9 in conjunction with operations that are the same as those described in Working Example G1 to thereby obtain a calcined powder. A paste was obtained from the calcined powder by the same manner as Working Example H1. This paste is used to form a layer by screen-printing onto a GDC fired body that is one type of SOFC electrolyte material. The resulting laminated body is dried and thermally treated in the same manner as Working Example H1 to obtain a laminated fired body.

The characteristics of the resulting laminated fired body are measured using the same operations as those described in i. above, and the results are shown in Table 9.

Working Example H4

Starting materials include powders of lanthanum hydroxide, nickel oxide, copper oxide, iron oxide, and calcium carbonate are used in the ratios as illustrated in Table 9 in conjunction with operations that are the same as those described in Working Example G1 to thereby obtain a calcined powder. After pulverization of the calcined powder, a paste was obtained from the calcined powder by the same manner as Working Example H1. This paste is used to form a layer by screen-printing onto a LaCaCrO$_3$ fired body that is one type of SOFC interconnector material. The resulting laminated body is dried and thermally treated in the same manner as Working Example H1 to obtain a laminated fired body.

The characteristics of the resulting laminated fired body are measured using the same operations as those described in i. above, and the results are shown in Table 9. However since the LaCaCrO$_3$ fired body that acts as a substrate also exhibits conductivity, the measurement of the conductivity is performed in the same manner as Working Example H2.

Working Example H5

Starting materials include powders of lanthanum hydroxide, nickel oxide, copper oxide, iron oxide, strontium carbonate, zirconium oxide are used in the ratios as illustrated in Table 9 in conjunction with operations that are the same as those described in Working Example G1 to thereby obtain a calcined powder. A paste was obtained from the calcined powder by the same manner as Working Example H1. This paste is used to form a layer by screen-printing onto a LaSrCoFeO$_3$ fired body that is an SOFC cathode material. The resulting laminated body is dried and thermally treated in the same manner as Working Example H1 to obtain a laminated fired body.

The characteristics of the resulting laminated fired body are measured using the same operations as those described in i. above, and the results are shown in Table 9. However since the LaSrCoFeO$_3$ fired body that acts as a substrate also exhibits conductivity, the measurement of the conductivity is performed in the same manner as Working Example H2.

[Results]

As shown in FIG. 2, the crystal phase of the sintered body in Working Example E1 is a perovskite single phase. Although this is not shown, the crystal phase of any of Working Example E1-E23, F1-F23, G1-G3 and H1-H5, and Comparative Examples A1-A6, B1-B3, C1-C4, and D1-D7 is also a perovskite single phase.

In the Working Examples E1-E23 that are fired in O$_2$ as shown in Table 1, relatively high conductivity of at least 680 S/cm is obtained at not more than 900° C., and in particular, conductivity of at least 800 S/cm is obtained at temperature of 750° C. Furthermore in Working Examples E1-E23, coefficient of thermal expansion not more than 14.0 ppm/K is obtained.

Next, reference is made to the results in Comparative Examples A1-A6, B1-B3, and C1-C4 (Table 2 to Table 4). These comparative examples are fired in O$_2$ in the same manner as Working Examples E1-E23. However, in contrast to Working Examples E1-E23, Comparative Examples A1-A6 is subjected to single substitution using Cu or Fe, and simultaneous substitution with Cu and Fe is not executed.

As shown in Table 2, LaNiO$_{3-\delta}$ that does not include Cu and Fe has low conductivity and high coefficient of thermal expansion (Comparative Example A1).

Figure 3:
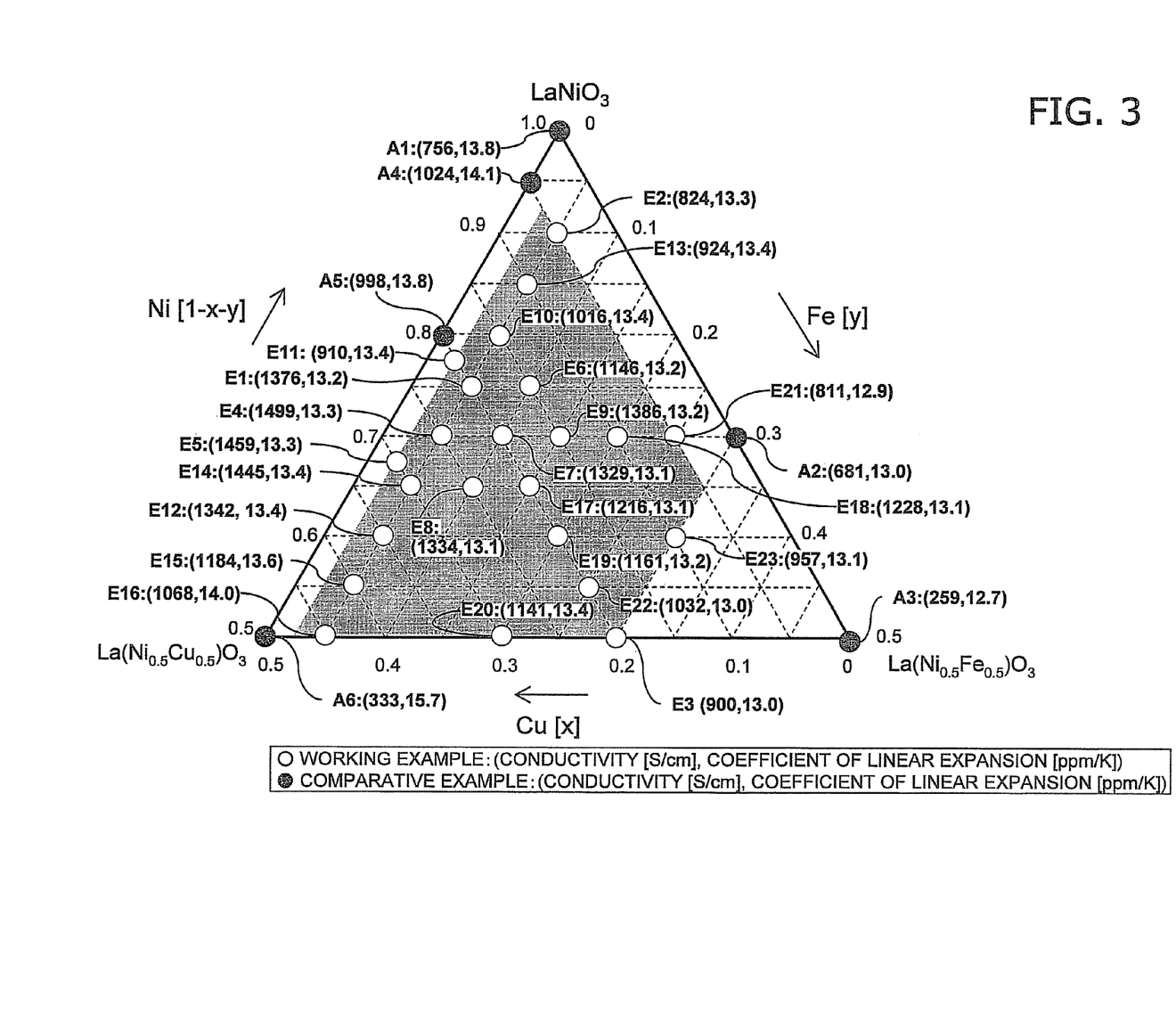
FIG. 3 is a composition diagram of Working Examples E1-E23 and Comparative Examples A1-A6. In the figure, the coefficient of thermal expansion of the test material and the conductivity at 750° C. are both shown in each example.

When executing single substitution using Cu (Comparative Examples A4-A6, FIG. 3), as shown in Table 2, although relatively high conductivity is exhibited in 0.05≤x≤0.2, the coefficient of thermal expansion is high. When x=0.5, the conductivity is conspicuously small and the coefficient of thermal expansion is even higher. The reason for the reduction in conductivity is thought to be due to the fact that mobility of the carrier is reduced by removal of oxygen from the test sample and due to a reduction in the carrier concentration as a result of conversion of a large amount of Cu to a divalent by the removal of oxygen from the test material. The increase in the coefficient of thermal expansion is considered to be due to the increase in the lattice volume due to removal of oxygen under high temperature.

When executing simple substitution using Fe (Comparative Examples A2-A3, FIG. 3), as shown in Table 2, the coefficient of thermal expansion is suppressed to a low value when 0.3≤x≤0.5. However, conductivity is reduced as the degree of substitution is increased. The reduction in the conductivity is considered to result from a reduction in the carrier concentration due to an absence of Cu when only Fe substitution is executed, or a reduction in the mobility of the carrier, or both.

As shown in Table 3, almost no improvement in conductivity was exhibited by simultaneous substitution of Fe and Co (Comparative Examples B1-B3). Furthermore, in these comparative examples, the coefficient of thermal expansion is large, and preferred characteristics as an electrode material are not observed.

As shown in Table 4, conductivity is extremely low, and the coefficient of thermal expansion is large due to simultaneous substitution of Sr, Fe and Co (Comparative Examples C1-C4).

As described above, Working Examples E1-E23 that are fired in $O_2$ obtain a substance that is adapted for use as an electrode material in relation to both conductivity and coefficient of thermal expansion, in comparison to single substitution with Fe or Cu (Comparative Examples A1-A6), or simultaneous substitution with Fe and Co (Comparative Examples B1-B3), or with Fe, Co and Sr (Comparative Examples C1-C4).

Next, a test sample that is fired in air was examined.

As shown in Table 5, in Working Examples F1-F23 which are fired in air, a relatively large conductivity of at least 680 S/cm was obtained at 900° C., and in particular, conductivity of at least 800 S/cm is obtained at 750° C. Furthermore in Working Examples F1-F23, coefficient of thermal expansion not more than 14.5 ppm/K, and in particular not more than 14.4 ppm/K is obtained.

In contrast, as shown in Table 6, $LaNiO_{3-\delta}$ that does not include Cu and Fe exhibits reduced conductivity when fired in air (Comparative Example D1).

Figure 4:
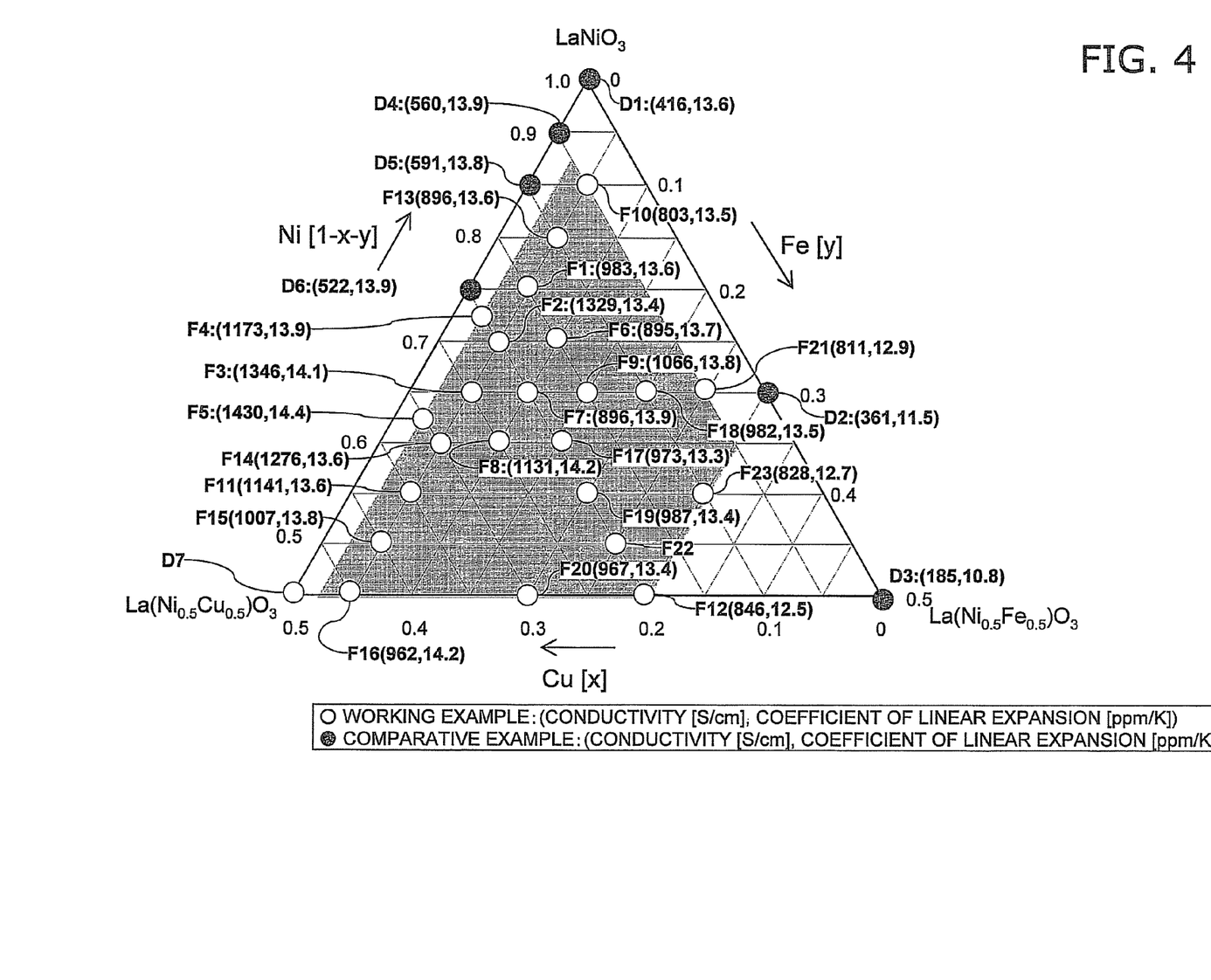
FIG. 4 is a composition diagram of Working Examples F1-F23 and Comparative Examples D1-D7. In the figure, the coefficient of thermal expansion of the test material and the conductivity at 750° C. are both shown in each example.

When executing single substitution using Cu (Comparative Examples D4-D7, FIG. 4), as shown in Table 6, conductivity is conspicuously reduced. The reason for the reduction in conductivity is considered to be the fact that mobility of the carrier and the concentration of carrier are reduced as a result of removal of oxygen from the test sample during firing since Fe is absent.

As described above, Working Examples F1-F23 that are fired in air obtain superior characteristics as an electrode material in relation to conductivity or coefficient of thermal expansion, or in relation to both conductivity and coefficient of thermal expansion, in comparison to simultaneous substitution with Fe and Co (Comparative Examples B1-B3), or with Fe, Co and Sr (Comparative Examples C1-C4).

As clearly demonstrated by the above description, a material having the composition of $La_{1-s}A_sNi_{1-x-y-z}Cu_xFe_yB_zO_{3-\delta}$. (Working Examples E1-E23, F1-F23, G1-G3, H1-H5) obtains superior characteristics as an electrode material used in a fuel cell. In other words, preferred characteristics as an electrode material for a fuel cell are obtained both in respect of conductivity and coefficient of thermal expansion by simultaneous substitution of Cu and Fe.

The reason for such superior characteristics will be examined below.

It is likely that the carrier concentration is increased in $La_{1-s}A_sNi_{1-x-y-z}Cu_xFe_yB_zO_{3-\delta}$ as a result of substitution of Ni by trivalent Cu which includes a higher number of electrons, and consequently the conductivity is improved.

Generally, it is considered to be difficult to achieve a sufficient increase in a carrier concentration with substitution only with Cu since oxygen in the test sample is removed under high temperature in air, and therefore forms bivalent Cu. However, the Gibbs energy of Fe which substituted at the same time is lower than the Gibbs energy of Ni or Cu, and therefore simultaneous substitution with Fe is thought to suppress removal of oxygen from the test sample. Consequently, Ni in $LaNi_{1-x-y}Cu_xFe_yO_{3-\delta}$ can be substituted to a large degree by trivalent Cu.

Generally, electrons migrate via oxygen in an electrode material having a perovskite structure, and therefore when there is a deficiency due to removal of oxygen, there is a risk that the mobility of the carrier will be reduced. In the material system of the working examples, since the mobility of the carrier is maintained by suppressing removal of oxygen by simultaneous substitution of Fe, a reduction in conductivity under a condition of high temperature in air, and in particular under a conditions of removal of oxygen can be suppressed.

When there is a deficiency in oxygen, a material that has a perovskite structure is expected to undergo an expansion in lattice volume as a result of an increase in the distance between the atoms that constitute the material. In the material system according to the working examples, it is considered to be likely that the coefficient of thermal expansion is reduced as a result of the reduction in the exchange of oxygen by Fe between the atmosphere and the test sample, and more particularly as a result of suppressing removal of oxygen under conditions of an air and high temperature that facilitate oxygen removal.

It is thought that the conductivity is increased by increasing the concentration of the carrier by producing trivalent Cu as the value for δ that expresses the oxygen nonstoichiometry becomes smaller. Furthermore, it is considered that the conductivity is increased, and the mobility of the carrier is increased in the test sample as complete crystallization in which there is no deficiency in the atoms constituting the perovskite is approached.

Table 1
Table 2
Table 3
Table 4
Table 5
Table 6
Table 7
Table 8
Table 9

TABLE 1

| WORKING EXAMPLE | Cu x | Fe y | La(OH)$_3$ | NiO | CuO | Fe$_2$O$_3$ | CALCINATION TEMPERATURE [° C.] | FIRING TEMPERATURE [° C.] | FIRING TIME [hour] | FIRING ATMOSPHERE |
|---|---|---|---|---|---|---|---|---|---|---|
| E1  | 0.20 | 0.05 | 1.000 | 0.750 | 0.200 | 0.025 | 1100 | 1100 | 12 | OXYGEN |
| E2  | 0.05 | 0.05 | 1.000 | 0.900 | 0.050 | 0.025 | 1200 | 1200 | 12 | OXYGEN |
| E3  | 0.20 | 0.30 | 1.000 | 0.500 | 0.200 | 0.150 | 1100 | 1100 | 12 | OXYGEN |
| E4  | 0.25 | 0.05 | 1.000 | 0.700 | 0.250 | 0.025 | 1100 | 1100 | 12 | OXYGEN |
| E5  | 0.30 | 0.03 | 1.000 | 0.670 | 0.300 | 0.015 | 1100 | 1100 | 12 | OXYGEN |
| E6  | 0.15 | 0.10 | 1.000 | 0.750 | 0.150 | 0.050 | 1100 | 1100 | 12 | OXYGEN |
| E7  | 0.20 | 0.10 | 1.000 | 0.700 | 0.200 | 0.050 | 1100 | 1100 | 12 | OXYGEN |
| E8  | 0.25 | 0.10 | 1.000 | 0.650 | 0.250 | 0.050 | 1100 | 1100 | 12 | OXYGEN |
| E9  | 0.15 | 0.15 | 1.000 | 0.700 | 0.150 | 0.075 | 1100 | 1100 | 12 | OXYGEN |
| E10 | 0.15 | 0.05 | 1.000 | 0.800 | 0.150 | 0.025 | 1100 | 1000 | 12 | OXYGEN |
| E11 | 0.20 | 0.03 | 1.000 | 0.770 | 0.200 | 0.015 | 1100 | 1000 | 12 | OXYGEN |
| E12 | 0.35 | 0.05 | 1.000 | 0.600 | 0.350 | 0.025 | 1100 | 1100 | 12 | OXYGEN |
| E13 | 0.10 | 0.05 | 1.000 | 0.850 | 0.100 | 0.025 | 1100 | 1100 | 12 | OXYGEN |
| E14 | 0.30 | 0.05 | 1.000 | 0.650 | 0.300 | 0.025 | 1100 | 1100 | 12 | OXYGEN |
| E15 | 0.40 | 0.05 | 1.000 | 0.550 | 0.400 | 0.025 | 1100 | 1100 | 12 | OXYGEN |
| E16 | 0.45 | 0.05 | 1.000 | 0.500 | 0.450 | 0.025 | 1100 | 1100 | 12 | OXYGEN |

TABLE 1-continued

| | Cu x | Fe y | La(OH)₃ | NiO | CuO | Fe₂O₃ | CALCINATION TEMPERATURE [° C.] | FIRING TEMPERATURE [° C.] | FIRING TIME [hour] | FIRING ATMOSPHERE |
|---|---|---|---|---|---|---|---|---|---|---|
| E17 | 0.20 | 0.15 | 1.000 | 0.650 | 0.200 | 0.075 | 1100 | 1100 | 12 | OXYGEN |
| E18 | 0.10 | 0.20 | 1.000 | 0.700 | 0.100 | 0.100 | 1100 | 1100 | 12 | OXYGEN |
| E19 | 0.20 | 0.20 | 1.000 | 0.600 | 0.200 | 0.100 | 1100 | 1100 | 12 | OXYGEN |
| E20 | 0.30 | 0.20 | 1.000 | 0.500 | 0.300 | 0.100 | 1100 | 1100 | 12 | OXYGEN |
| E21 | 0.05 | 0.25 | 1.000 | 0.700 | 0.050 | 0.125 | 1100 | 1100 | 12 | OXYGEN |
| E22 | 0.20 | 0.25 | 1.000 | 0.550 | 0.200 | 0.125 | 1100 | 1100 | 12 | OXYGEN |
| E23 | 0.10 | 0.30 | 1.000 | 0.600 | 0.100 | 0.150 | 1100 | 1100 | 12 | OXYGEN |

| WORKING EXAMPLE | FIRED BODY DENSITY [%] | CONDUCTIVITY [S/cm] | | | | | COEFFICIENT OF LINEAR EXPANSION [ppm/K] |
|---|---|---|---|---|---|---|---|
| | | 600° C. | 700° C. | 750° C. | 800° C. | 900° C. | |
| E1 | 92.5 | 1585.9 | 1450.7 | 1376.0 | 1290.6 | 1176.9 | 13.2 |
| E2 | 68.0 | 963.2 | 870.6 | 823.6 | 773.1 | 682.2 | 13.3 |
| E3 | 79.5 | 1035.4 | 943.2 | 899.5 | 835.0 | 728.0 | 13.0 |
| E4 | 79.3 | 1841.0 | 1612.5 | 1498.8 | 1391.7 | 1186.8 | 13.3 |
| E5 | 80.8 | 1806.7 | 1570.0 | 1459.3 | 1347.0 | 1132.6 | 13.3 |
| E6 | 75.2 | 1355.0 | 1211.7 | 1145.6 | 1077.1 | 916.5 | 13.2 |
| E7 | 79.9 | 1606.4 | 1419.1 | 1329.4 | 1243.6 | 1066.0 | 13.1 |
| E8 | 84.5 | 1629.7 | 1423.3 | 1334.3 | 1241.2 | 1051.7 | 13.1 |
| E9 | 80.9 | 1611.7 | 1456.7 | 1385.7 | 1291.2 | 1136.2 | 13.2 |
| E10 | 58.9 | 1194.6 | 1074.4 | 1015.5 | 957.6 | 837.0 | 13.4 |
| E11 | 61.2 | 1090.2 | 967.3 | 909.5 | 851.7 | 730.8 | 13.4 |
| E12 | 97.8 | 1533.4 | 1409.3 | 1341.9 | 1270.8 | 1117.8 | 13.4 |
| E13 | 74.2 | 1089.0 | 978.4 | 923.8 | 869.2 | 762.3 | 13.4 |
| E14 | 96.5 | 1744.7 | 1541.7 | 1444.7 | 1346.8 | 1151.9 | 13.4 |
| E15 | 95.0 | 1353.4 | 1243.9 | 1184.4 | 1121.7 | 986.6 | 13.6 |
| E16 | 97.0 | 1262.4 | 1131.1 | 1068.3 | 997.9 | 863.6 | 14.0 |
| E17 | 80.4 | 1455.8 | 1290.7 | 1215.6 | 1133.6 | 976.5 | 13.1 |
| E18 | 77.3 | 1427.8 | 1290.6 | 1227.6 | 1143.9 | 1006.6 | 13.1 |
| E19 | 81.6 | 1390.4 | 1232.8 | 1161.0 | 1082.6 | 932.7 | 13.2 |
| E20 | 91.8 | 1325.7 | 1202.9 | 1140.7 | 1072.9 | 936.2 | 13.4 |
| E21 | 71.4 | 1145.1 | 1056.8 | 1014.0 | 965.9 | 884.1 | 13.1 |
| E22 | 80.3 | 1211.9 | 1089.0 | 1032.0 | 960.2 | 832.2 | 13.0 |
| E23 | 75.5 | 1090.3 | 1000.0 | 956.8 | 900.4 | 806.1 | 13.1 |

TABLE 2

| COMPARATIVE EXAMPLE | Cu x | Fe y | La(OH)₃ | NiO | CuO | Fe₂O₃ | CALCINATION TEMPERATURE [° C.] | FIRING TEMPERATURE [° C.] | FIRING TIME [hour] | FIRING ATMOSPHERE |
|---|---|---|---|---|---|---|---|---|---|---|
| A1 | — | — | 1 | 1 | — | — | 900 | 900 | 12 | OXYGEN |
| A2 | — | 0.3 | 1 | 0.7 | — | 0.15 | 1200 | 1200 | 12 | OXYGEN |
| A3 | — | 0.5 | 1 | 0.5 | — | 0.25 | 1200 | 1200 | 12 | OXYGEN |
| A4 | 0.05 | — | 1 | 0.95 | 0.05 | — | 900 | 900 | 12 | OXYGEN |
| A5 | 0.2 | — | 1 | 0.8 | 0.2 | — | 900 | 900 | 12 | OXYGEN |
| A6 | 0.5 | — | 1 | 0.5 | 0.5 | — | 900 | 900 | 12 | OXYGEN |

| COMPARATIVE EXAMPLE | FIRED BODY DENSITY [%] | CONDUCTIVITY [S/cm] | | | | | COEFFICIENT OF LINEAR EXPANSION [ppm/K] |
|---|---|---|---|---|---|---|---|
| | | 600° C. | 700° C. | 750° C. | 800° C. | 900° C. | |
| A1 | 55 | 867.5 | 792.7 | 755.5 | 721.6 | 647.7 | 13.8 |
| A2 | 66.8 | 746.5 | 704 | 681.4 | 663.2 | 629.5 | 13 |
| A3 | 62.8 | 261.5 | 260.7 | 259.2 | 257.5 | 253.7 | 12.7 |
| A4 | 63.8 | 1275.6 | 1076 | 1023.8 | 976.4 | 881.2 | 14.1 |
| A5 | 71.9 | 1208.9 | 1064.9 | 997.6 | 928.6 | 789.3 | 13.8 |
| A6 | 69.7 | 406.7 | 355.6 | 333.2 | 306.9 | 261.1 | 15.7 |

TABLE 3

| COMPARATIVE EXAMPLE | Fe a | Co b | La(OH)₃ | NiO | Fe₂O₃ | Co₃O₄ | CALCINATION TEMPERATURE [° C.] | FIRING TEMPERATURE [° C.] | FIRING TIME [TIME] | FIRING ATMOSPHERE |
|---|---|---|---|---|---|---|---|---|---|---|
| B1 | 0.10 | 0.40 | 1.000 | 0.500 | 0.050 | 0.133 | 900 | 1200 | 12 | OXYGEN |
| B2 | 0.25 | 0.25 | 1.000 | 0.500 | 0.125 | 0.083 | 900 | 1200 | 12 | OXYGEN |
| B3 | 0.40 | 0.10 | 1.000 | 0.500 | 0.200 | 0.033 | 900 | 1200 | 12 | OXYGEN |

TABLE 3-continued

| COMPARATIVE EXAMPLE | FIRED BODY DENSITY [%] | CONDUCTIVITY [S/cm] | | | | | COEFFICIENT OF LINEAR EXPANSION [ppm/K] |
|---|---|---|---|---|---|---|---|
| | | 600° C. | 700° C. | 750° C. | 800° C. | 900° C. | |
| B1 | 78.4 | 854.8 | 822.2 | 805.5 | 789.5 | 754.4 | 15.6 |
| B2 | 76.6 | 569.8 | 559.4 | 553.1 | 545.7 | 533.8 | 14.8 |
| B3 | 71.5 | 381.5 | 379.9 | 379.4 | 376.3 | 368.7 | 13.5 |

TABLE 4

| COMPARATIVE EXAMPLE | Sr c | Fe a | Co b | La(OH)$_3$ | SrCO$_3$ | NiO | Fe$_2$O$_3$ | Co$_3$O$_4$ | CALCINATION TEMPERATURE [° C.] | FIRING TEMPERATURE [° C.] | FIRING TIME [hour] | FIRING ATMOSPHERE |
|---|---|---|---|---|---|---|---|---|---|---|---|---|
| C1 | 0.10 | 0.40 | 0.10 | 0.900 | 0.100 | 0.500 | 0.200 | 0.033 | 900 | 900 | 12 | OXYGEN |
| C2 | 0.20 | 0.40 | 0.10 | 0.900 | 0.200 | 0.500 | 0.200 | 0.033 | 900 | 900 | 12 | OXYGEN |
| C3 | 0.10 | 0.25 | 0.25 | 0.900 | 0.100 | 0.500 | 0.125 | 0.083 | 900 | 900 | 12 | OXYGEN |
| C4 | 0.10 | 0.10 | 0.40 | 0.900 | 0.100 | 0.500 | 0.050 | 0.133 | 900 | 900 | 12 | OXYGEN |

| COMPARATIVE EXAMPLE | FIRED BODY DENSITY [%] | CONDUCTIVITY [S/cm] | | | | | COEFFICIENT OF LINEAR EXPANSION [ppm/K] |
|---|---|---|---|---|---|---|---|
| | | 600° C. | 700° C. | 750° C. | 800° C. | 900° C. | |
| C1 | 62.1 | 251.3 | 241.1 | 235.0 | 229.3 | 213.3 | 13.7 |
| C2 | 63.2 | 240.6 | 222.8 | 211.6 | 201.1 | 176.1 | 16.6 |
| C3 | 61.5 | 351.4 | 335.0 | 325.3 | 315.3 | 289.4 | 16.1 |
| C4 | 64.2 | 456.8 | 435.5 | 422.9 | 409.9 | 376.2 | 17.3 |

TABLE 5

| WORKING EXAMPLE | Cu x | Fe y | La(OH)$_3$ | NiO | CuO | Fe$_2$O$_3$ | CALCINATION TEMPERATURE [° C.] | FIRING TEMPERATURE [° C.] | FIRING TIME [hour] | FIRING ATMOSPHERE |
|---|---|---|---|---|---|---|---|---|---|---|
| F1 | 0.15 | 0.05 | 1.000 | 0.800 | 0.150 | 0.025 | 1100 | 1000 | 1 | AIR |
| F2 | 0.20 | 0.05 | 1.000 | 0.750 | 0.200 | 0.025 | 1100 | 1000 | 1 | AIR |
| F3 | 0.25 | 0.05 | 1.000 | 0.700 | 0.250 | 0.025 | 1100 | 1000 | 1 | AIR |
| F4 | 0.20 | 0.03 | 1.000 | 0.770 | 0.200 | 0.015 | 1100 | 1000 | 1 | AIR |
| F5 | 0.30 | 0.03 | 1.000 | 0.670 | 0.300 | 0.015 | 1100 | 1000 | 1 | AIR |
| F6 | 0.15 | 0.10 | 1.000 | 0.750 | 0.150 | 0.050 | 1100 | 1000 | 1 | AIR |
| F7 | 0.20 | 0.10 | 1.000 | 0.700 | 0.200 | 0.050 | 1100 | 1000 | 1 | AIR |
| F8 | 0.25 | 0.10 | 1.000 | 0.650 | 0.250 | 0.050 | 1100 | 1000 | 1 | AIR |
| F9 | 0.15 | 0.15 | 1.000 | 0.700 | 0.150 | 0.075 | 1100 | 1000 | 1 | AIR |
| F10 | 0.05 | 0.05 | 1.000 | 0.900 | 0.050 | 0.025 | 1100 | 1000 | 1 | AIR |
| F11 | 0.35 | 0.05 | 1.000 | 0.600 | 0.350 | 0.025 | 1100 | 1000 | 1 | AIR |
| F12 | 0.20 | 0.30 | 1.000 | 0.500 | 0.200 | 0.150 | 1100 | 1000 | 1 | AIR |
| F13 | 0.10 | 0.05 | 1.000 | 0.850 | 0.100 | 0.025 | 1100 | 1000 | 1 | AIR |
| F14 | 0.30 | 0.05 | 1.000 | 0.650 | 0.300 | 0.025 | 1100 | 1000 | 1 | AIR |
| F15 | 0.40 | 0.05 | 1.000 | 0.550 | 0.400 | 0.025 | 1100 | 1000 | 1 | AIR |
| F16 | 0.45 | 0.05 | 1.000 | 0.500 | 0.450 | 0.025 | 1100 | 1000 | 1 | AIR |
| F17 | 0.20 | 0.15 | 1.000 | 0.650 | 0.200 | 0.075 | 1100 | 1000 | 1 | AIR |
| F18 | 0.10 | 0.20 | 1.000 | 0.700 | 0.100 | 0.100 | 1100 | 1000 | 1 | AIR |
| F19 | 0.20 | 0.20 | 1.000 | 0.600 | 0.200 | 0.100 | 1100 | 1000 | 1 | AIR |
| F20 | 0.30 | 0.20 | 1.000 | 0.500 | 0.300 | 0.100 | 1100 | 1000 | 1 | AIR |
| F21 | 0.05 | 0.25 | 1.000 | 0.700 | 0.050 | 0.125 | 1100 | 1000 | 1 | AIR |
| F22 | 0.20 | 0.25 | 1.000 | 0.550 | 0.200 | 0.125 | 1100 | 1000 | 1 | AIR |
| F23 | 0.10 | 0.30 | 1.000 | 0.600 | 0.100 | 0.150 | 1100 | 1000 | 1 | AIR |

| WORKING EXAMPLE | FIRED BODY DENSITY [%] | CONDUCTIVITY [S/cm] | | | | | COEFFICIENT OF LINEAR EXPANSION [ppm/K] |
|---|---|---|---|---|---|---|---|
| | | 600° C. | 700° C. | 750° C. | 800° C. | 900° C. | |
| F1 | 71.9 | 1151.8 | 1040.2 | 983.0 | 922.2 | 801.1 | 13.6 |
| F2 | 79.0 | 1531.7 | 1401.1 | 1329.0 | 1246.5 | 1136.7 | 13.4 |
| F3 | 83.6 | 1464.9 | 1338.3 | 1246.0 | 1159.4 | 985.5 | 14.1 |
| F4 | 79.1 | 1405.1 | 1254.8 | 1173.2 | 1091.4 | 953.9 | 13.9 |
| F5 | 85.4 | 1766.8 | 1545.9 | 1430.3 | 1322.3 | 1142.7 | 14.4 |
| F6 | 73.3 | 1045.0 | 946.5 | 894.2 | 848.2 | 725.7 | 13.7 |
| F7 | 77.4 | 1066.0 | 952.7 | 896.3 | 846.1 | 726.7 | 13.9 |
| F8 | 82.0 | 1384.5 | 1218.0 | 1131.5 | 1076.8 | 895.2 | 14.2 |
| F9 | 73.3 | 1256.0 | 1126.0 | 1066.3 | 1004.8 | 876.6 | 13.8 |
| F10 | 69.4 | 961.7 | 844.3 | 803.0 | 764.7 | 687.8 | 13.5 |

TABLE 5-continued

|  |  |  |  |  |  |  |
|---|---|---|---|---|---|---|
| F11 | 91.9 | 1298.2 | 1193.1 | 1140.6 | 1075.9 | 946.3 | 13.6 |
| F12 | 77.9 | 968.4 | 882.2 | 845.5 | 781.0 | 680.9 | 12.5 |
| F13 | 75.6 | 1058.7 | 945.9 | 896.1 | 847.2 | 749.5 | 13.6 |
| F14 | 91.7 | 1522.1 | 1364.2 | 1275.7 | 1195.9 | 1023.9 | 13.6 |
| F15 | 90.3 | 1145.8 | 1053.1 | 1006.7 | 949.6 | 835.3 | 13.8 |
| F16 | 95.0 | 1132.8 | 1014.9 | 961.5 | 895.4 | 774.9 | 14.2 |
| F17 | 84.4 | 1164.0 | 1035.9 | 972.5 | 920.0 | 785.8 | 13.3 |
| F18 | 72.3 | 1156.8 | 1037.1 | 982.1 | 925.4 | 807.4 | 13.5 |
| F19 | 77.5 | 1181.2 | 1051.2 | 986.9 | 933.6 | 797.4 | 13.4 |
| F20 | 90.0 | 1122.9 | 1018.9 | 969.6 | 908.8 | 792.9 | 13.4 |
| F21 | 66.4 | 914.5 | 843.2 | 811.2 | 779.4 | 715.9 | 12.9 |
| F22 | 77.1 | 1087.8 | 979.2 | 928.8 | 868.3 | 749.2 | 13.2 |
| F23 | 72.2 | 941.5 | 862.7 | 828.4 | 780.2 | 698.4 | 12.7 |

TABLE 6

| COMPARATIVE EXAMPLE | Cu x | Fe y | La(OH)$_3$ | NiO | CuO | Fe$_2$O$_3$ | CALCINATION TEMPERATURE [° C.] | FIRING TEMPERATURE [° C.] | FIRING TIME [hour] | FIRING ATMOSPHERE |
|---|---|---|---|---|---|---|---|---|---|---|
| D1 | — | — | 1.000 | 1.000 | — | — | 900 | 1000 | 1 | AIR |
| D2 | — | 0.30 | 1.000 | 0.700 | — | 0.150 | 1200 | 1000 | 1 | AIR |
| D3 | — | 0.50 | 1.000 | 0.500 | — | 0.250 | 1200 | 1000 | 1 | AIR |
| D4 | 0.05 | — | 1.000 | 0.950 | 0.050 | — | 900 | 1000 | 1 | AIR |
| D5 | 0.10 | — | 1.000 | 0.900 | 0.100 | — | 900 | 1000 | 1 | AIR |
| D6 | 0.20 | — | 1.000 | 0.800 | 0.200 | — | 900 | 1000 | 1 | AIR |
| D7 | 0.50 | 0.000 | 1.000 | 0.500 | 0.500 | 0.000 | 900 | 1000 | 1 | AIR |

| COMPARATIVE EXAMPLE | FIRED BODY DENSITY [%] | CONDUCTIVITY [S/cm] | | | | | COEFFICIENT OF LINEAR EXPANSION [ppm/K] |
|---|---|---|---|---|---|---|---|
|  |  | 600° C. | 700° C. | 750° C. | 800° C. | 900° C. |  |
| D1 | 60.1 | 469.1 | 433.5 | 415.9 | 399.8 | 364.7 | 13.6 |
| D2 | 59.8 | 389.4 | 369.9 | 361.6 | 354.1 | 341.0 | 11.5 |
| D3 | 58.1 | 185.2 | 185.0 | 185.7 | 186.4 | 187.5 | 10.8 |
| D4 | 62.1 | 683.9 | 586.1 | 560.5 | 537.2 | 490.6 | 13.9 |
| D5 | 78.1 | 694.6 | 624.9 | 591.1 | 559.2 | 495.2 | 13.8 |
| D6 | 82.5 | 625.1 | 555.3 | 522.7 | 489.2 | 421.6 | 13.9 |
| D7 | 66.9 | 385.6 | 337.1 | 316.5 | 291.0 | 247.6 | 15.6 |

TABLE 7

| WORKING EXAMPLE | MOLAR RATIO | | | | | |
|---|---|---|---|---|---|---|
|  | La | Ni | Cu | Fe | O | δ |
| E1 | 1 | 0.75 | 0.20 | 0.05 | 3.0 | 0.0 |
| E3 | 1 | 0.50 | 0.19 | 0.31 | 3.0 | 0.0 |
| E4 | 1 | 0.70 | 0.25 | 0.05 | 2.9 | 0.1 |
| E5 | 1 | 0.67 | 0.30 | 0.03 | 2.8 | 0.2 |
| E9 | 1 | 0.68 | 0.16 | 0.16 | 2.8 | 0.2 |
| E13 | 1 | 0.60 | 0.35 | 0.05 | 2.7 | 0.3 |
| F2 | 1 | 0.76 | 0.19 | 0.05 | 2.8 | 0.2 |
| F3 | 1 | 0.70 | 0.25 | 0.05 | 2.7 | 0.3 |
| F5 | 1 | 0.68 | 0.29 | 0.03 | 2.6 | 0.4 |
| F9 | 1 | 0.68 | 0.16 | 0.16 | 2.7 | 0.3 |

TABLE 8

| WORKING EXAMPLE | Cu X | Fe y | A ATOMIC ELEMENT | s | M ATOMIC ELEMENT | z | CALCINATION TEMPERATURE [° C.] | FIRING TEMPERATURE [° C.] | FIRING TIME [hour] |
|---|---|---|---|---|---|---|---|---|---|
| G1 | 0.20 | 0.05 | — | — | — | — | 1100 | 1000 | 1 |
| G2 | 0.20 | 0.05 | — | — | Co | 0.005 | 1100 | 1000 | 1 |
| G3 | 0.20 | 0.05 | — | — | Co | 0.010 | 1100 | 1000 | 1 |

| WORKING EXAMPLE | FIRING ATMOSPHERE | FIRED BODY DENSITY [%] | CONDUCTIVITY at 750° C. [S/cm] | COEFFICIENT OF LINEAR EXPANSION [ppm/K] |
|---|---|---|---|---|
| G1 | AIR | 61.0 | 1030.7 | 13.2 |
| G2 | AIR | 65.0 | 1102.8 | 13.4 |
| G3 | AIR | 67.0 | 1154.4 | 13.5 |

TABLE 9

| WORKING EXAMPLE | Cu X | Fe Y | A ATOMIC ELEMENT | s | M ATOMIC ELEMENT | z | CALCINATION TEMPERATURE [° C.] | FIRING TEMPERATURE [° C.] | FIRING TIME [hour] |
|---|---|---|---|---|---|---|---|---|---|
| H1 | 0.20 | 0.05 | — | — | Zr | 0.010 | 1100 | 1000 | 1 |
| H2 | 0.20 | 0.05 | — | — | Mn | 0.020 | 1100 | 1000 | 1 |
| H3 | 0.20 | 0.05 | Gd | 0.005 | — | — | 1100 | 1000 | 1 |
| H4 | 0.20 | 0.05 | Ca | 0.005 | — | — | 1100 | 1000 | 1 |
| H5 | 0.20 | 0.05 | Sr | 0.005 | Zr | 0.010 | 1100 | 1000 | 1 |

| WORKING EXAMPLE | FIRING ATMOSPHERE | FIRED BODY DENSITY [%] | CONDUCTIVITY at 750° C. [S/cm] | COEFFICIENT OF LINEAR EXPANSION [ppm/K] |
|---|---|---|---|---|
| H1 | AIR | 55.0 | 968.9 | 13.1 |
| H2 | AIR | 65.0 | 1000.8 | 13.2 |
| H3 | AIR | 59.0 | 994.6 | 13.2 |
| H4 | AIR | 51.0 | 905.6 | 13.2 |
| H5 | AIR | 57.0 | 974.0 | 13.2 |

What is claimed is:

1. An electrode material containing a composition expressed by $La_{1-s}A_sNi_{1-x-y-z}Cu_xFe_yB_zO_{3-\delta}$, wherein, A and B are at least one element independently selected from the group consisting of alkaline earth metals, transition metals excluding Fe, Ni and Cu, and rare earths excluding La, and $x>0$, $y>0$, $x+y+z<1$, $0 \leq s \leq 0.05$, $0 \leq z \leq 0.05$, and $0.0 \leq \delta \leq 0.4$.

2. The electrode material according to claim 1 comprising a perovskite phase.

3. The electrode material according to claim 1 wherein $x \geq 0.05$.

4. The electrode material according to claim 1 wherein $x \leq 0.5$.

5. The electrode material according to claim 1 wherein $y \geq 0.03$.

6. The electrode material according to claim 1 wherein $y \leq 0.3$.

7. The electrode material according to claim 1 having conductivity at 750° C. is 800 S/cm or more.

8. The electrode material according to claim 1 having coefficient of thermal expansion is 14.5 ppm/K or less.

9. The electrode material according to claim 1 wherein element A is at least one element selected from the group consisting of alkaline earth metals and rare earths excluding La, and element B is at least one element selected from transition metals excluding Fe, Ni and Cu.

10. A fuel cell comprising
an anode;
a cathode;
a solid electrolyte layer provided between the anode and the cathode; and
a current collecting layer including the electrode material according to claim 1, and provided on the cathode on the opposite side to the solid electrolyte.

11. A method of manufacturing an electrode material comprising the step of:
firing a starting material including La, Ni, Cu and Fe, and having a molar ratio of La, Ni, Cu and Fe such that La:Ni:Cu:Fe=1:(1−x−y):x:y (wherein $0<x$, $0<y$, $x+y<1$) at not more than 1200° C., to form a composition expressed by $La_{1-s}A_sNi_{1-x-y-z}Cu_xFe_yB_zO_{3-\delta}$, wherein, A and B are at least one element independently selected from the group consisting of alkaline earth metals, transition metals excluding Fe, Ni and Cu, and rare earths excluding La, and $x>0$, $y>0$, $x+y+z<1$, $0 \leq s \leq 0.05$, $0 \leq z \leq 0.05$, and $0.0 \leq \delta \leq 0.4$.

12. The method of manufacturing according to claim 11 wherein the firing atmosphere in the firing step is an oxygen atmosphere.

13. The method of manufacturing according to claim 11 wherein the firing step includes thermal treatment of the starting material at 1100° C. or more.

14. The method of manufacturing according to claim 11 wherein before the firing step, a calcination processing step is included for thermal treatment of the starting material at 1100° C. or more.

15. The method of manufacturing according to claim 11 wherein before the firing step, a calcination processing step is included for thermal treatment of the starting material at 1100° C. or more, and the firing step is executed at less than 1100° C.

* * * * *